United States Patent
Diab

(10) Patent No.: US 8,108,699 B2
(45) Date of Patent: Jan. 31, 2012

(54) SYSTEM AND METHOD FOR POWER OVER ETHERNET CONFIGURATION FOR A POWER SOURCING EQUIPMENT USING A NETWORK PROFILE

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 625 days.

(21) Appl. No.: 12/242,845

(22) Filed: Sep. 30, 2008

(65) Prior Publication Data

US 2010/0083022 A1 Apr. 1, 2010

(51) Int. Cl.
*G05F 1/00* (2006.01)
*G06F 1/26* (2006.01)
*G06F 1/32* (2006.01)

(52) U.S. Cl. ......... 713/300; 713/310; 713/320; 713/340

(58) Field of Classification Search .................. 713/300, 713/310, 340
See application file for complete search history.

(56) References Cited

U.S. PATENT DOCUMENTS

| 7,155,622 B2* | 12/2006 | Mancey et al. | 713/324 |
| 7,340,325 B2* | 3/2008 | Sousa et al. | 700/295 |
| 7,355,416 B1* | 4/2008 | Darshan | 324/713 |
| 7,472,290 B2* | 12/2008 | Diab et al. | 713/300 |
| 7,549,067 B2* | 6/2009 | Tolliver | 713/320 |
| 7,685,440 B2* | 3/2010 | Blaha et al. | 713/300 |
| 7,870,401 B2* | 1/2011 | Diab et al. | 713/300 |
| 2006/0047800 A1* | 3/2006 | Caveney et al. | 709/223 |
| 2006/0143583 A1* | 6/2006 | Diab et al. | 716/4 |
| 2007/0277049 A1* | 11/2007 | Hansalia | 713/321 |

* cited by examiner

*Primary Examiner* — Brian Misiura
(74) *Attorney, Agent, or Firm* — Duane S. Kobaysahi

(57) ABSTRACT

A system and method for power over Ethernet (PoE) configuration for a power sourcing equipment using a network profile. Various types of PSE profile information can be stored in a network database. Upon startup or other configuration setting state, a PSE can retrieve the profile information from the network database and configure its operation based upon such retrieval. Remote configuration of the PSE is thereby enabled.

18 Claims, 4 Drawing Sheets

SYSTEM AND METHOD FOR POWER OVER ETHERNET CONFIGURATION FOR A POWER SOURCING EQUIPMENT USING A NETWORK PROFILE

BACKGROUND

1. Field of the Invention

The present invention relates generally to Power over Ethernet (PoE) and, more particularly, to a system and method for PoE configuration for a power sourcing equipment using a network profile.

2. Introduction

The IEEE 802.3af and 802.3at PoE specifications provide a framework for delivery of power from power sourcing equipment (PSE) to a powered device (PD) over Ethernet cabling. Various types of PDs exist, including voice over IP (VoIP) phones, wireless LAN access points, Bluetooth access points, network cameras, computing devices, etc.

In an enterprise, industrial, or other commercial environment, the power supplied to the various types of PDs is managed by a network of PSEs. Each of these PSEs can be deployed in different areas of the commercial premises and can be responsible for different types or groups of PDs. For example, one PSE can be responsible for PDs connected in a conference room, while another PSE can be responsible for a set of VoIP phones.

As would be appreciated, the various PSEs that are deployed can have different responsibilities in power management. Some PSEs may support a part of the infrastructure (e.g., wireless LAN access points), while others may support peripheral functions (e.g., conference room support). No single operating environment can be assumed.

Accordingly, one of the challenges in providing PoE support across a network of PDs is the support for differing roles and objectives for the various PSEs. For example, not only can available power supplies be different between PSEs, but the power allocation priorities and algorithms implemented by the PSEs can also vary significantly depending on the PDs that it is intended to support. What is needed therefore is an improved mechanism for managing the various PSEs in a PoE network.

SUMMARY

A system and/or method for PoE configuration for a power sourcing equipment using a network profile, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

PoE specifications such as IEEE 802.3af and 802.3at provide a framework for delivery of power from power sourcing equipment (PSE) to a powered device (PD) over Ethernet cabling. Various types of PDs exist, each having potentially different power profiles, network functions, roles within the commercial environment, etc. In managing such a diverse PD environment, no single PSE management role can be defined. In other words, a particular PSE's function beyond the basic function of providing power to a set of PDs over network cabling, can be dependent on the number, type, function, location, importance, etc. of the PDs that the PSE is managing.

In the present invention, it is recognized that the effective administration of such a diverse PoE network needs a systematic mechanism of managing the PSEs. This systematic mechanism is expected to produce consistent results in controlling a fixed and valuable network resource, power. Prior to describing the details of the present invention, reference is first made to FIG. 1, which illustrates an example of a conventional power over Ethernet (PoE) system.

As illustrated, the PoE system includes PSE 120 that transmits power to powered device (PD) 140 over two wire pairs. As would be appreciated, the principles of the present invention can be applied to powering over four wire pairs. Power delivered by the PSE to the PD is provided through the application of a voltage across the center taps of a first transformer that is coupled to a transmit (TX) wire pair and a second transformer that is coupled to a receive (RX) wire pair carried within an Ethernet cable.

Figure 1:
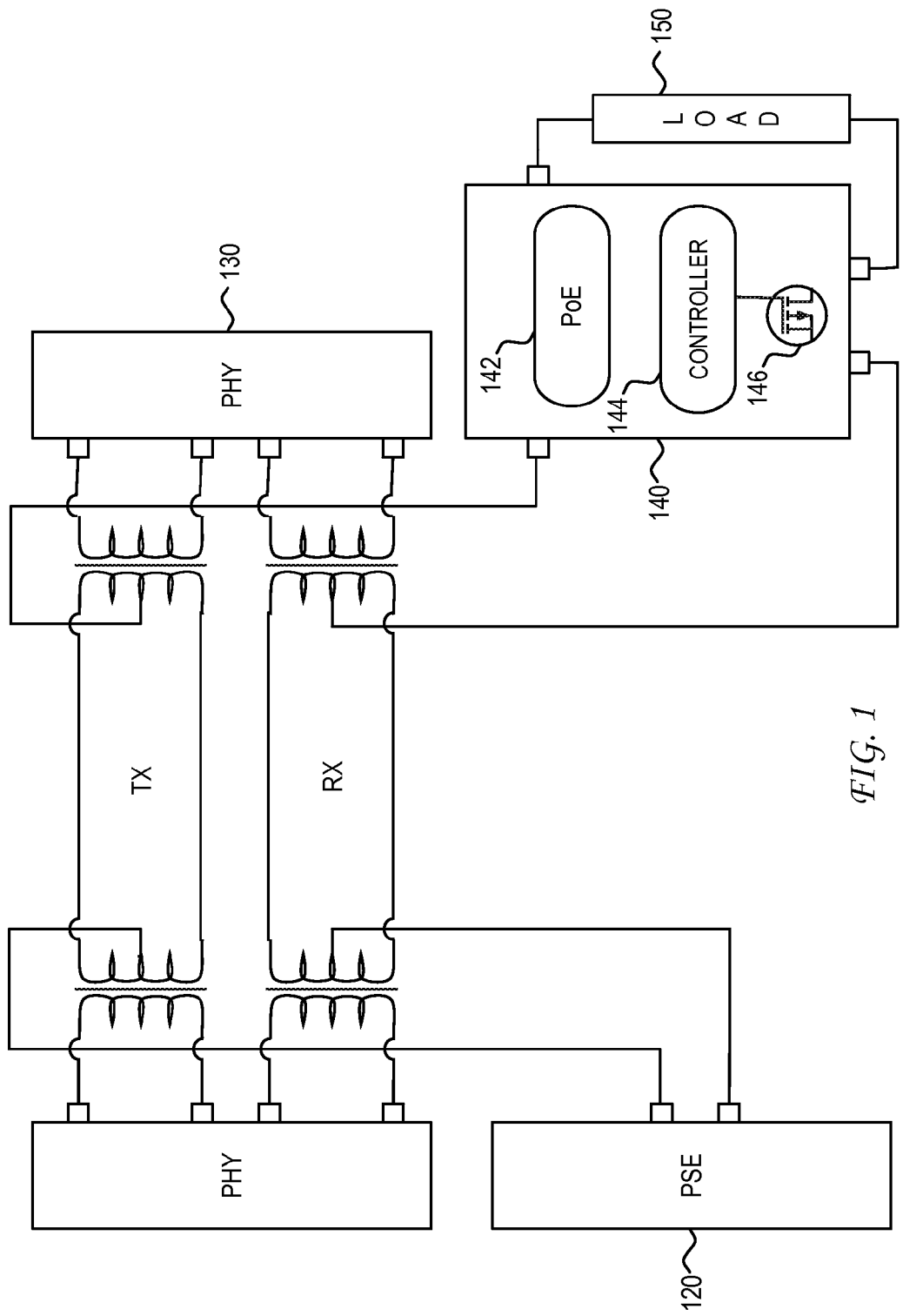
FIG. 1 illustrates an embodiment of a PoE system.

As is further illustrated in FIG. 1, PD 140 includes PoE module 142. PoE module 142 includes the electronics that would enable PD 140 to communicate with PSE 120 in accordance with a PoE specification such as IEEE 802.3af (PoE), 802.3at (PoE Plus), legacy PoE transmission, proprietary PoE powering, or any other type of PoE transmission. PD 140 also includes controller 144 (e.g., pulse width modulation DC:DC controller) that controls power FET 146, which in turn provides constant power to load 150.

As noted, one of the responsibilities of PSE 120 is to manage the power that is supplied to a set of PDs 140. In one example, the PSE can be designed to manage a set of PDs in a conference room. Here, the PSE can have 5-20 ports that are designed to support computing devices such as a laptop computer. As would be appreciated, computing devices can have highly varying power requirements depending on the existence and state of operation of various internal or externally supported components. Power usage can also be highly dependent on the application(s) running on the computing device. In this environment, the PSE would be responsible for distributing a fixed amount of power to a plurality of high-power devices. The fixed amount of power can be easily oversubscribed, albeit for a generally non-critical function (e.g., charging a laptop battery). In arbitrating this oversubscribed situation, the PSE may need to arbitrate the distribution of power amongst competing devices.

Figure 2:
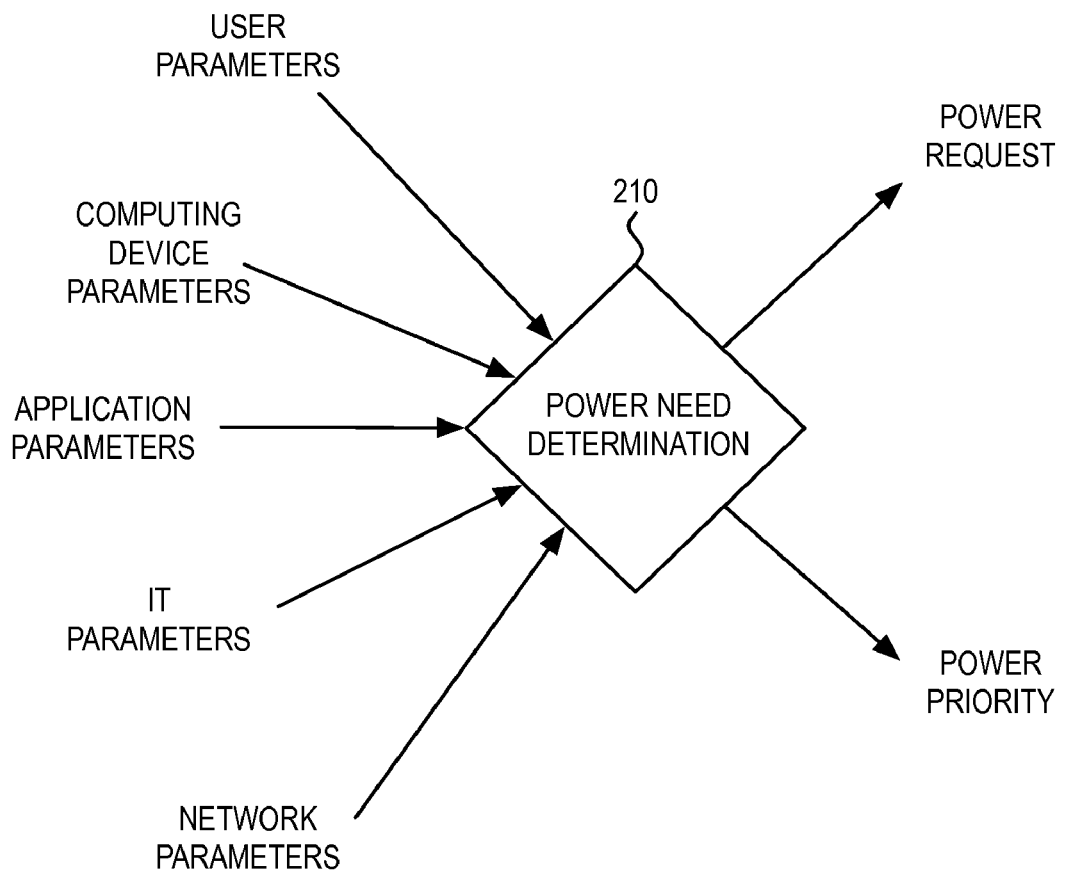
FIG. 2 illustrates an example power need determination mechanism.

In one example, this management process is facilitated by a power need determination for the PDs. FIG. 2 illustrates an example mechanism of using various power management information in a power need determination process. In this example, the power management information includes general classes of information such as user parameters (e.g., management, engineering, marketing, admin, user priority level, etc.); computing device parameters (e.g., battery capacity, battery life, system states, processor states, device states, etc.); application parameters (e.g., mode of operation, application load, etc.); IT parameters (e.g., computing device model, IT policies, performance characteristic data, etc.); and network parameters (e.g., length of cable, type of cable, etc.). With this input set of power management information, power need determination 210 can then produce a power request and power priority for the computing device. The resulting power request and power priority can then guide the PSE in ultimately allocating an amount of power to a particular computing device.

As noted, this conference room example can largely relate to the power management of a set of user devices. The use of such devices are typically temporary in nature, and non-critical when judged beyond measures of convenience.

Not every PSE would be so used, however. In another example, a PSE can be designed to provide power for a set of VoIP phones or wireless access points. This set of PDs represent a different class of device relative to the user devices of the conference room example. Here, the VoIP phones or wireless access points represent devices that are more closely related to the infrastructure of the commercial environment. As such, their power needs need to be supported and managed in a different manner.

For example, infrastructure-type devices would clearly have a higher priority than a user device. This priority of device support can also necessitate the need for backup power for the PSE power supplies. Thus, while a conference room PSE would be called upon to manage a set of PDs that oversubscribe a fixed amount of power, an infrastructure PSE would be called upon to manage a set of PDs that need to remain powered using primary and possibly secondary power sources. In another example, one PSE can be assigned to a public domain conference room, while another PSE can be assigned to a secure conference rooms. In yet another example, different PSEs can have different power supplies attached to them. These leads to different use profiles that describe their configured operation.

As these examples illustrate, the management of the various PSEs in a network can involve significantly different PSE functions. These functions can also be mixed based upon changes in the connectivity between PSEs and PDs. For example, a PSE that supports a conference room can be reassigned to supporting infrastructure-type devices. Alternatively, a PSE can be partially reassigned such that it supports a mix of devices. In these various changes, it is important that the PSE configuration be managed effectively such that sufficient device support is provided for each of the connected PDs.

Figure 3:
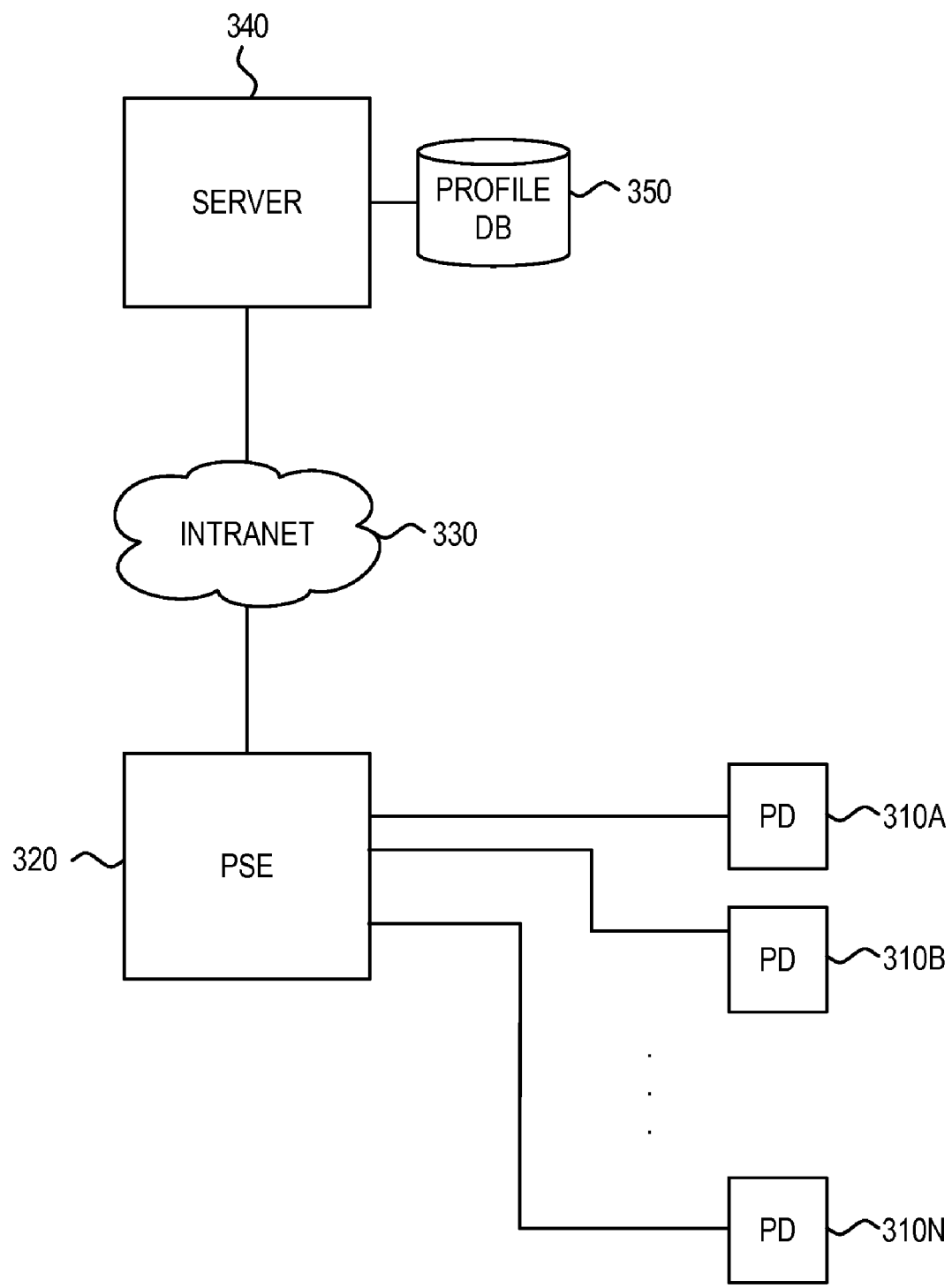
FIG. 3 illustrates an embodiment of a network profile access system.

It is therefore a feature of the present invention that configuration of the various PSEs is managed through a profile database that is accessible by a PoE system via a network (e.g., Intranet). FIG. 3 illustrates an example of such a network configuration.

As illustrated, PSE 320, which can be part of a switch, supports a plurality of PDs 310A-310N. In establishing an operation configuration of PSE 320, PSE 320 would access profile database 350 via server 340. Server 340 is linked to PSE 320 via intranet 330. To illustrate the utility of such a network configuration reference is now made to the flowchart of FIG. 4.

Figure 4:
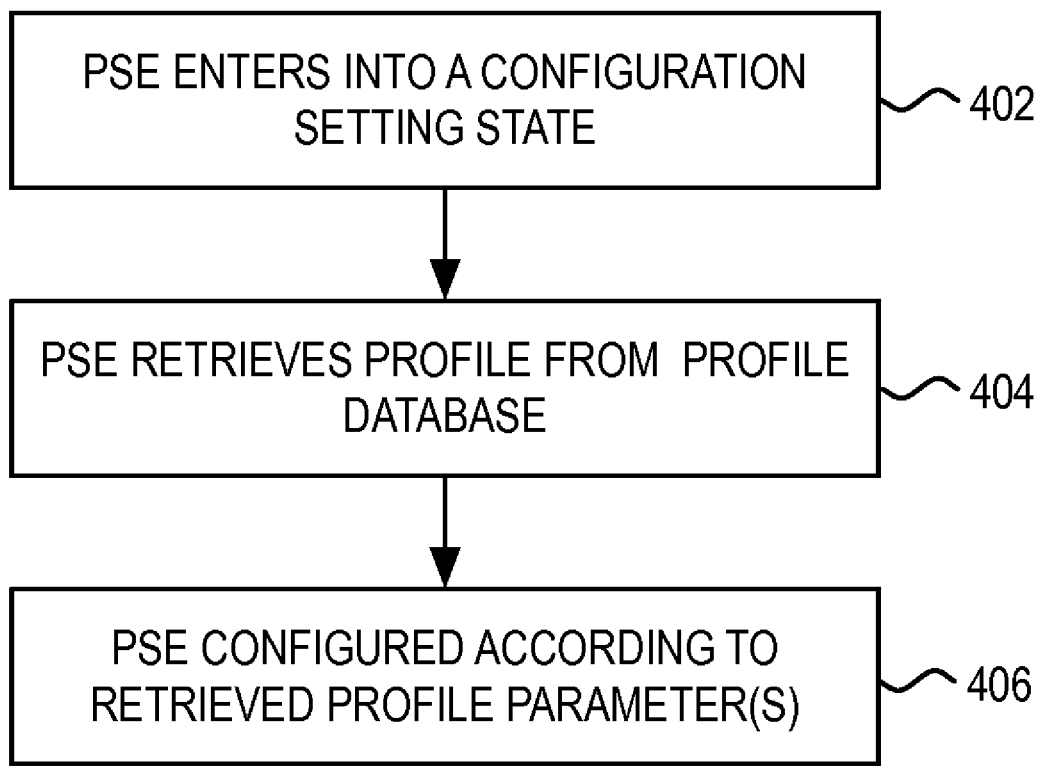
FIG. 4 illustrates a flowchart of a configuration of a PSE using network profiles.

As illustrated, the process of FIG. 4 begins at step 402 where the PSE enters into a configuration setting state. In one embodiment, this configuration setting state is coincident with a startup or restart event for the PSE. In another embodiment, this configuration setting state can occur during active operation of the PSE such that one or more parameters that govern the PSE's operation is modified.

At step 404, the PSE then retrieves a profile for the PSE from the profile database. In one embodiment, the profile is retrieved based on a unique management address (e.g., MAC address) assigned to the PSE. As would be appreciated, any identifier that distinguishes between the various PSEs would be sufficient to facilitate access of the profile database. In various embodiments, the database access can be facilitated by a Layer 2 or Layer 3 mechanism.

In various embodiments, the profile information can be retrieved as a whole or in part. The entire profile can be retrieved where an entire configuration is being applied, while a part of the profile can be retrieved to change one or more parameters in a partial reconfiguration scenario. This would facilitate an update of a single parameter at the PSE. For example, during active operation, the PSE can be alerted that there is a change to the total power available to the PSE. This total power available parameter can then be retrieved from the profile database in a defined reconfiguration cycle.

At step 406, the PSE is configured according to the retrieved profile parameter(s). For example, where the total power available parameter is retrieved, then the PSE can configure its allocation of power to a set of PDs in accordance with the retrieved total power available parameter. In general, the particular ways by which profile information can be used to configure the PSE would be implementation dependent. The key here is that a systematic approach can be used to configure the various PSEs in the PoE network remotely. To illustrate the benefits of such an approach, various examples of profile information are provided below.

In one example, a profile can include information related to power priorities. For example, the profile can include information regarding the various power priorities that should be applied to the different ports of the PSE. As port assignments change as devices are connected or disconnected from the PSE, the profile information can also be updated accordingly. In this manner, the profile information can be used to update the configuration of the PSE such that the high-priority ports remain powered to the extent possible.

In another example, a profile can include information regarding a particular allocation algorithm that should be used by the PSE in managing the power allocation to the various PDs. In one scenario, the profile would include information regarding the various weightings of different input parameters that can influence initial or subsequent changes to the power allocated to the different ports.

In yet another example, a profile can include information that identifies the number and types of power supplies that are available to the PSE. This information can change as PSEs are manually configured for deployment. The retrieval of this type of profile information would be key for the PSE in understanding the various power backup scenarios that can be utilized.

As would be appreciated, various other types of information can be included in the profile. For example, power budget information, the number of ports enabled, security/authentication parameters for the various ports, PD information (e.g., state, state detection, failover parameters, or the like), etc. can be included within the profile.

As has been described, profile information for use in the configuration/reconfiguration of a PSE can be retrieved from a database that is remote from the PSE. This database retrieval can be initiated by the PSE at any point after the PSE is powered.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A configuration method in a power sourcing equipment in a power over Ethernet system, comprising:
    upon startup of the power sourcing equipment, retrieving a power sourcing equipment profile from a network database, said network database being remote from said power sourcing equipment;
    configuring parameters of operation for said power sourcing equipment based on said retrieved power sourcing equipment profile, wherein said configuring comprises identifying a number of power supplies coupled to said power sourcing equipment;
    detecting a powered device that is coupled to said power sourcing equipment via a network cable; and
    determining an amount of power to be delivered to said computing device via said network cable, said determination being based on said configured parameters.

2. The method of claim 1, wherein said configuring further comprises identifying a total power budget.

3. The method of claim 1, wherein said configuring further comprises identifying a power backup plan.

4. The method of claim 1, wherein said configuring further comprises identifying a power allocation algorithm.

5. The method of claim 1, wherein said configuring further comprises identifying a power priority algorithm.

6. The method of claim 1, wherein said configuring further comprises configuring an authentication mechanism.

7. The method of claim 1, wherein said configuring further comprises configuring a security mechanism.

8. A power over Ethernet system, comprising:
    a network database that stores a plurality of profiles for a corresponding plurality of power sourcing equipment; and
    a power sourcing equipment remote from said network database, said power sourcing equipment being operative to retrieve a profile from said network database, said retrieved profile enabling said power sourcing equipment to identify a pool of power available to said power sourcing equipment, said identified available pool of power enabling said power sourcing equipment to determine an allocation of power to a plurality of powered devices coupled to said power sourcing equipment.

9. The system of claim 8, wherein said power sourcing equipment accesses said network database as part of a startup routine.

10. The system of claim 8, wherein said power sourcing equipment configures a power budget for one or more devices based on a total power budget available to said power sourcing equipment, said total power budget being determined using said retrieved profile.

11. The system of claim 8, wherein said power sourcing equipment configures a power backup plan based on said retrieved profile.

12. The system of claim 8, wherein said retrieved profile identifies a number of power supplies coupled to said power sourcing equipment.

13. The system of claim 8, wherein said retrieved profile identifies types of power supplies coupled to said power sourcing equipment.

14. A power over Ethernet method in a power sourcing equipment, comprising:
    retrieving, from a network database remote from said power sourcing equipment, a profile associated with said power sourcing equipment, said retrieved profile enabling said power sourcing equipment to identify a pool of power available to said power sourcing equipment; and
    determining a power budget allocation that is applicable to one or more powered devices that are served by said power sourcing equipment, wherein said power budget allocation is determined using said available pool of power that is identified using said retrieved profile.

15. The method of claim 14, wherein said retrieving comprises retrieving during a startup routine of the power sourcing equipment.

16. The method of claim 14, wherein said available pool of power is determined using a number of power supplies identified in said retrieved profile.

17. The method of claim 14, wherein said available pool of power is determined using a type of power supplies identified in said retrieved profile.

18. The method of claim 14, wherein said available pool of power is determined using information about one or more power supplies that is included in said retrieve profile.

* * * * *